United States Patent
Kienzle et al.

(10) Patent No.: US 8,136,642 B2
(45) Date of Patent: Mar. 20, 2012

(54) BRAKE DISK WITH INTERMEDIATE LAYER

(75) Inventors: Andreas Kienzle, Balgheim (DE); Ingrid Kratschmer, Biberbach (DE)

(73) Assignee: Audi, AG, Ingolstadt (DE)

( * ) Notice: Subject to any disclaimer, the term of this patent is extended or adjusted under 35 U.S.C. 154(b) by 1305 days.

(21) Appl. No.: 11/589,807

(22) Filed: Oct. 31, 2006

(65) Prior Publication Data

US 2007/0158150 A1    Jul. 12, 2007

(30) Foreign Application Priority Data

Nov. 5, 2005    (DE) .......................... 10 2005 052 802

(51) Int. Cl.
*F16D 65/10*    (2006.01)
(52) U.S. Cl. ............................. 188/251 M; 100/218 XL
(58) Field of Classification Search ............ 188/218 XL, 188/251 A, 251 M; 428/141, 408; 264/122, 264/128; 523/149, 150
See application file for complete search history.

(56) References Cited

U.S. PATENT DOCUMENTS

| | | | |
|---|---|---|---|
| 6,221,475 B1 * | 4/2001 | Domergue et al. | 428/292.1 |
| 7,445,095 B2 * | 11/2008 | Bauer et al. | 188/218 XL |
| 2002/0153213 A1 * | 10/2002 | Gruber et al. | 188/218 XL |
| 2003/0003286 A1 * | 1/2003 | Gruber et al. | 428/293.4 |
| 2003/0207749 A1 * | 11/2003 | Bauer et al. | 501/88 |
| 2005/0043433 A1 * | 2/2005 | Kienzle et al. | 523/149 |
| 2005/0179152 A1 * | 8/2005 | Bauer et al. | 264/29.1 |

FOREIGN PATENT DOCUMENTS

| | | |
|---|---|---|
| DE | 691 08 776 T2 | 8/1995 |
| DE | 44 38 455 C1 | 5/1996 |
| DE | 44 38 456 A1 | 5/1996 |
| DE | 197 11 829 C1 | 9/1998 |
| DE | 198 34 704 C2 | 2/2000 |
| DE | 100 14 418 C2 | 10/2001 |
| DE | 100 48 012 A1 | 4/2002 |
| DE | 198 34 704 C2 | 8/2002 |
| DE | 100 14 418 C2 | 7/2003 |
| DE | 101 64 226 A1 | 7/2003 |
| DE | 101 61 218 B4 | 6/2004 |
| DE | 103 10 945 A1 | 10/2004 |
| DE | 101 31 769 B4 | 3/2005 |
| DE | 100 56 044 B4 | 8/2005 |
| DE | 100 66 044 B4 | 8/2005 |
| EP | 1 277 715 A2 | 7/2002 |
| EP | 1 277 715 A2 | 1/2003 |

* cited by examiner

*Primary Examiner* — Christopher Schwartz
(74) *Attorney, Agent, or Firm* — Novak Druce + Quigg LLP

(57) ABSTRACT

Carbon-ceramic brake disks that comprise several layers, whereby at least one layer is used as a bearing element and at least one layer acts as a friction layer, whereby the bearing element and at least one friction layer are separated by an intermediate layer, characterized in that the intermediate layer has reinforcement fibers in the form of fiber bundles, whereby the fiber bundles are encased by a layer that consists of a mixture of silicon carbide, silicon and carbon, which can be obtained by heat treatment of a mixture that consists of silicon powder and a carbonized resin or carbonized pitch at a temperature of 900° C. up to 1700° C. in an environment devoid of oxidizing agents. A process for their manufacture and use, in particular in automotive brake systems.

5 Claims, No Drawings

BRAKE DISK WITH INTERMEDIATE LAYER

This application claims priority from DE 10 2005 052 802.3, filed Nov. 5, 2005, herein incorporated by reference in its entirety.

This invention relates to carbon-ceramic brake disks, that is, brake disks that consist of a material that has ceramic phases that are reinforced with fibers that consist of carbon, in particular those brake disks that comprise several layers, whereby at least one layer (base layer) is used as a bearing element and at least one layer acts as a friction layer, whereby the bearing element and at least one friction layer are separated by an intermediate layer.

Carbon-ceramic brake disks are known from, i.a., the German Patent DE 44 38 455 C1.

It has proven advantageous to construct such brake disks from several layers that are shaped like cylindrical rings, whereby at least one layer is used as a bearing element and a friction layer that is also shaped like a cylindrical ring is applied to at least one of the top surfaces of this bearing element. Such a design is described in the German Published Patent Application DE 44 38 456 A1.

The task of the bearing element is to transfer moment produced during the braking process to the shaft; to this end, a high torsional rigidity (modulus of torsion) and high torsional strength are necessary, which also remain unchanged even in the high operating temperatures reached. Ceramic materials that are reinforced with long fibers (mean fiber length of at least 5 mm), whose matrix preferably contains silicon carbide, in particular in combination with small portions of carbon and elementary silicon, are advantageous in this respect.

In the braking process, the friction layer is in tribological contact with the brake pads and is to have as stress-independent and temperature-independent friction coefficients as possible in combination with the brake pads in the range of: $=0.4$ to $0.9$. Further, wear is to be slight; also, in particular for the application in automobiles, good resistance to cyclic temperature fluctuations and to the action of moisture and salt solutions is required. As a material of the friction layers, especially short-fiber-reinforced or low-fiber ceramic materials have proven their value. Also, materials are preferred here whose matrix contains silicon carbide, in particular in combination with small portions of carbon and elementary silicon.

Materials whose percentage by mass of reinforcement fibers is no more than 45% are referred to here as "low-fiber." Fibers whose mean length is below 5 mm, preferably 0.1 mm to 4.5 mm and especially 0.3 mm to 4 mm, are referred to here as short fibers.

Because of the different material composition, different thermal expansion coefficients are produced for these preferred materials. In the cyclic thermal stresses typical of brake disks, this results in stresses that can lead first to micro-cracks and even to macroscopic damages and failure of the component.

It is possible to adjust the thermal expansion coefficients by different additives in the materials, but this is always possible only for a limited temperature range.

It is therefore the object to indicate a design for a carbon-ceramic brake disk that reduces such stresses, without in this case impairing the required mechanical, thermal and tribological properties.

This object is achieved by carbon-ceramic brake disks that comprise several layers, whereby at least one layer is used as a bearing element and at least one layer acts as a friction layer, whereby the bearing element and at least one friction layer are separated by an intermediate layer, which has reinforcement fibers in the form of fiber bundles, and the fiber bundles are encased by a layer that consists of a mixture of silicon carbide, silicon and carbon, which can be obtained by thermal treatment of a mixture that consists of silicon powder and a carbonized resin or carbonized pitch at a temperature of 900° C. to 1700° C. in an environment devoid of oxidizing agents, whereby the material of the coating is converted into a mixture of silicon carbide, carbon and silicon, with carbonization of the resin or pitch and at least partial reaction of silicon with carbon formed by the carbonization to form silicon carbide.

The invention further relates to a process for the production of carbon-ceramic brake disks with a base layer, at least one friction layer, and at least one intermediate layer that is configured between the base layer and at least one friction layer, comprising the steps Filling a compression mold in succession with a molding compound as a precursor to at least one friction layer, a molding compound as a precursor to at least one intermediate layer, a molding compound as a precursor to the base layer, optionally a molding compound as a precursor to another intermediate layer and optionally finally a molding compound as a precursor to another friction layer, whereby the molding compounds in each case contain carbonizable organic binders.

Hardening of the layers under the effect of temperature and pressure in a press, Carbonization of the hardened mother substance that is produced at a temperature of 750° C. to 1300° C., preferably 900° C. to 120° C., in an environment devoid of oxidizing agents, whereby the carbonizable organic binder that is contained in the molding compounds is essentially converted into carbon, and thus a carbonized mother substance is produced, and Subsequent reaction of at least a portion of the carbon in the carbonized mother substance under the action of carbide-forming elements to form carbides of these elements, at a temperature of at least 10 K above the melting point of the element in question or a mixture of several such elements, up to 400 K above the melting point of the element in question or a mixture of several such elements.

In the case of using silicon as a carbide-forming element, the temperature range is thus preferably 1420° C. up to 1800° C.

It is also possible within the scope of the invention to produce a mother substance that is hardened or carbonized corresponding to the friction layer separately and to press together with the molding compounds for the other layers; it is also possible to produce the hardened or carbonized mother substance for the bearing element separately and to press together with the molding compounds for the friction layer and intermediate layer.

The bearing element is a ceramic material that is reinforced with longitudinal fibers, whose matrix preferably contains silicon carbide, in particular in combination with small portions of carbon and elementary silicon. Those made of carbon are preferably used as reinforcement fibers. In this case, the percentage by mass in such a material is from 30% to 70% for silicon carbide, preferably from 35% to 65%, and especially from 40% to 60%. The percentage by mass of carbon in the material is from 20% to 60%, preferably from 25% to 55%, and especially preferably from 30% to 50%; whereby between 30 and 70% of this percentage by mass of carbon originates from the reinforcement fibers. The percentage by mass of silicon in the material is from 5% to 20%, preferably from 8% to 17%.

The mean thermal expansion coefficient of the material for the bearing element is between 1:m/(m≅K) and 4:m/(m≅K), whereby because of the preferred orientation of the reinforcement fibers in the bearing element parallel to the top surface of the cylindrical ring, the mean thermal expansion coefficient parallel to the top surface of 1:m/(m≅K) is up to 2.5:m (m≅K). In particular, the thermal expansion coefficient is between 1.2:m/(m≅K), and 2.3:m≅(m≅K), preferably between 1.4:m/(m≅K) and 2.1:m/(m≅K).

The friction layer preferably contains reinforcement fibers in the form of short fibers, with a mean length of less than 5 mm, especially preferably up to 3 mm, and in particular up to 2 mm, whereby the percentage by mass of the reinforcement fibers in the friction layer is preferably from 5% to 45%, especially preferably from 10% up to 40%, and in particular 15% up to 35%. Also here, fibers that consist of carbon are preferred. The mean thermal expansion coefficient of the friction layer is between 2.5:m/(m≅K) and 5:m/(m≅K), preferably between 2.7:m/(m≅K) and 4.8:m/(m≅K), and in particular 2.9:m/(m≅K) up to 4.6:m/(m≅K). It is also possible not to use any reinforcement fibers in the friction layer but rather inert fillers such as alpha-silicon carbide, boron carbide, and metal carbides such as titanium carbide, tungsten carbide, iron carbides and particulate carbon. Of course, the above-mentioned fillers can also be used in combination with reinforcement fibers.

As already indicated above, the intermediate layer has reinforcement fibers in the form of fiber bundles, whereby the fiber bundles are encased by a layer that consists of a mixture of silicon carbide, silicon and carbon. This layer can be produced by heat treatment of fiber bundles that are coated with a mixture that consists of silicon powder, preferably in a percentage by mass of 10% to 45% in the mixture, and a carbonizable resin or carbonizable pitch and then are treated at a temperature of 900° C. to 1700° C. in an environment devoid of oxidizing agents. In the process first the resin or the pitch is converted by carbonization into carbon, which then reacts with the silicon with the formation of silicon carbide. Among the carbonizable resins, phenol resins are preferred. Another preferred variant is to use additional silicon carbide in the alpha-modification as a component of this mixture, in particular in a percentage by mass of 5% to 30% in the mixture.

It was found that by such a coating of reinforcement fiber bundles, in particular those of carbon, and mixing of thus coated fiber bundles with binders, such as phenol resins, pitches, furan resins or mixtures of these binders, especially in combination with the above-mentioned fillers, the mean thermal expansion coefficient of the ceramic material produced therefrom can be set in a targeted manner. In this case, the mean thermal expansion coefficient can be set in a targeted manner both by the type and amount of the coating and by the ratio of the mass of the binder to the mass of the coated fiber bundle and optionally the other additives. Depending on the composition of the intermediate layer, values for the thermal expansion coefficients of 1.7:m/(m≅K) and 4.5:m/(m≅K) can be set. In this case, it is preferred to select a value for the thermal expansion coefficient, which approximately corresponds to the mean of the thermal expansion coefficients of that of the bearing element and of that of the friction layer. Surprisingly enough, it has also turned out that the tendency toward cracking in the intermediate layer containing these fibers bundles is itself suppressed to a great extent at quick temperature changes by the special coating of the fiber bundles even at high thermal expansion coefficients.

Coatings of these reinforcement fiber bundles, which contain mixtures of phenol resins with particulate silicon, have an especially advantageous effect. In this case, it is advantageous to apply several, i.e., at least two, such coatings in succession and over one another on the reinforcement fiber bundles.

Based on these coated bundles of reinforcement fibers, molding compounds for the intermediate layer are produced, which in addition to these coated reinforcement fiber bundles also contain a mixture that consists of particulate silicon, carbonizable resins or pitches or mixtures thereof, as well as optionally fillers selected from the group of alpha-silicon carbide, boron carbide, and metal carbides such as titanium carbide, tungsten carbide, iron carbides and particulate carbon.

The molding compounds for bearing elements and friction layers correspond in their composition preferably to those that are known from DE 101 31 769.

Powders with a particle size of 50 nm to 1 mm are referred to as "particulate."

Binders, i.e., resins and pitches and mixtures thereof, are referred to as "carbonizable" if they produce a residue of at least 10% of their original mass during heating in an environment devoid of oxidizing agents to temperatures of 1100° C. up to 1700° C., whereby this residue consists essentially of carbon, i.e., up to more than 50% of carbon.

Short fibers that are essentially configured in parallel to one another with a mean quadratic angular deviation $$a = 3(n_i \equiv \forall_1^2)/3n_i$$

of up to 0.2 are referred to as "fiber bundles," whereby $\forall_i$ is the angle of deviation of a fiber from the mean orientation angle $\langle\forall\rangle$, measured in angular degrees (round angle=360°), and $n_i$ is the number of all fibers with this angle of deviation. The mean fiber length of the reinforcement fibers in the fiber bundles of the intermediate layer is preferably 0.3 mm to 20 mm, especially preferably 0.1 mm to 30 mm, and in particular 0.5 mm to 15 mm. The mean diameter of the fiber bundle is preferably 300:m to 400:m, at a diameter of the individual fibers of preferably 4:m to 12:m, especially preferably 5:m to 10:m, and in particular 6:m to 8:m. The thickness of the coating on the fiber bundles after the heat treatment is preferably 5% to 80% of the diameter of the fiber bundle, especially preferably 10% to 60%.

A symmetrical construction of a carbon-ceramic brake disk is preferred, whereby an intermediate layer is applied to the central bearing element in the form of a cylindrical ring on each top surface, and a friction layer is applied on the intermediate layer on every side that faces away from the bearing element. It is further preferred that cooling ducts, whose longitudinal axis in the plane runs parallel to the top surfaces and that are open to the outside perimeter and to the inside perimeter of the cylindrical ring, run inside the bearing element. In the case of a carbon-ceramic brake disk with, for example, a total thickness of 34 mm, in each case thicknesses of between 0.8 mm and 2 mm, preferably 0.9 to 1.7 mm, are applied to the friction layers; in each case 0.3 to 3 mm, preferably 0.8 to 2.5 mm, are preferably applied to the underlying intermediate layers; and a thickness of 24 mm to 31.4 mm is preferably applied to the base layer or the bearing element. The height of the cooling ducts in axial direction of the cylindrical ring-shaped carbon-ceramic brake disk is preferably one third of the thickness of the base layer, i.e., preferably 8 mm to 10.5 mm.

The invention claimed is:

1. A process for the production of carbon-ceramic brake disks the method comprising:

pouring into a compression mold in succession:

a first molding compound comprising a first carbonizable organic binder as a precursor to a first friction layer, a second molding compound comprising a second carbonizable organic binder as a precursor to a first intermediate layer, a third molding compound comprising a third carbonizable organic binder as a precursor to a bearing element, a fourth molding compound comprising a fourth carbonizable organic binder as a precursor to a second intermediate layer, and a fifth molding compound comprising a fifth carbonizable organic binder as a precursor to a second friction layer;

hardening the layers in a press to form a mother substance;

carbonizing the mother substance at a temperature of 750 degrees Celsius to 1300 degrees Celsius in an environment devoid of oxidizing agents carbonized, wherein each of the first, second, third, fourth, and fifth carbonizable organic binders are converted essentially to carbon; and reacting at least a portion of the carbon in the carbonized mother substance with one or more carbide-forming elements to form one or more carbides, at a temperature in a range of at least 10 K to 400 k above the melting point of the one or more carbide-forming elements.

2. The process according to claim 1, further comprising coating fiber bundles with a coating composition comprising a phenol resin and silicon powder with a grain size distribution of 0.05:m to 1000:m;

treating the coated fiber bundles at a temperature of 900 degrees Celsius to 1700 degrees Celsius in an environment devoid of oxidizing agents, whereby the material of the coating is converted into a mixture of silicon carbide, carbon and silicon, with carbonization of the phenol resin and at least partial reaction of the silicon with carbon, formed by the carbonization, to form silicon carbide; and incorporating the fiber bundles into at least one of the first intermediate layer and the second intermediate layer.

3. The process according to claim 2, wherein the coating composition for the fiber bundles comprises from 10% to 45% by weight of silicon powder.

4. The process according to claim 2, wherein the coating composition further comprises alpha-silicon carbide powder in a percentage by mass of 5% to 30%.

5. The process according to claim 1, wherein silicon is used as a carbide-forming element.

* * * * *